(12) United States Patent
Smith

(10) Patent No.: US 10,882,437 B2
(45) Date of Patent: Jan. 5, 2021

(54) TRAILER PONTOON DEVICE AND SYSTEM

(71) Applicant: Anita Smith, Speedwell, TN (US)

(72) Inventor: Anita Smith, Speedwell, TN (US)

(*) Notice: Subject to any disclaimer, the term of this patent is extended or adjusted under 35 U.S.C. 154(b) by 90 days.

(21) Appl. No.: 16/231,123

(22) Filed: Dec. 21, 2018

(65) Prior Publication Data

US 2020/0198518 A1 Jun. 25, 2020

(51) Int. Cl.
*B60F 3/00* (2006.01)
*B60P 3/10* (2006.01)
*B63B 17/00* (2006.01)
*B63B 35/34* (2006.01)

(52) U.S. Cl.
CPC .......... *B60P 3/1058* (2013.01); *B60F 3/0092* (2013.01); *B63B 17/00* (2013.01); *B63B 35/34* (2013.01); *B60F 2301/04* (2013.01)

(58) Field of Classification Search
CPC .............. B60F 2301/04; B60F 2301/00; B60F 2301/02; B60F 3/0092; B60F 3/0061; B60F 3/0069; B60P 3/105; B60P 3/1058
See application file for complete search history.

(56) References Cited

U.S. PATENT DOCUMENTS

| | | | | |
|---|---|---|---|---|
| 3,779,574 A * | 12/1973 | Ow | .................. | B60F 3/0092 280/43.18 |
| 4,025,010 A * | 5/1977 | Soot | .................. | B60F 3/0092 248/641 |
| 2013/0217280 A1* | 8/2013 | Gibbs | .................. | B60F 3/0007 440/12.63 |
| 2018/0126893 A1* | 5/2018 | Schierbaum | .......... | B60P 3/1066 |

* cited by examiner

*Primary Examiner* — Andrew Polay
(74) *Attorney, Agent, or Firm* — Lyman Moulton, Esq.; Moulton Patents, PLLC

(57) ABSTRACT

A trailer pontoon bottom has built in wheels designed to fold under the trailer pontoon to be clear of the water and to extend out and lock for land use and be clear of the pontoons. A pair of swing arms each having a first end attached to an inside axial hub of the wheel are designed to rotate on a boss of the first end. A second end of the swing arm is configured to rotate a maximum of 90 degrees from its folded position into a trailer position. An axis parallel to a back end of the trailer pontoon is configured to attach to each of the pair of swing arms at a respective pivot located a swing arm distance from an edge of the trailer pontoon. The axis is rotatable by less than 90 degrees to enable each wheel to retract against a suspension bumper.

19 Claims, 12 Drawing Sheets

TRAILER PONTOON DEVICE AND SYSTEM

BACKGROUND

Pontoons and trailers for pontoons are made in a variety of ways to work together to get a pontoon across land and into the water. For instance, a pontoon trailer provides the wheels for land operation that the pontoon itself doesn't possess since it is optimized for water operation. Glide rails and bunks are provided in pontoon trailers for loading a pontoon and supporting it during land travel. Additionally, a capacity of a pontoon is limited to passenger carriage and not for bulky frames, supporting wheels and wheel gear and stop structures.

Various models of pontoon trailers are usually used by the boat owner/operator for towing the pontoon and often for storage. For instance, the roll-on model, also known as a "Roller style trailer", uses rubber and/or polyurethane rollers for ease of launching and loading a boat. The glide-on, also known as a "Float-on" style trailer allows the boat to float onto the trailer; after trailer has been partially submerged in water, usually ¾ of the trailer. Since its inception it has become quite popular v.s. the "Roller style trailer".

However, all of these models increase the weight of the trailer pontoon system without providing any benefit to the owner/operator. A more sophisticated system is needed to transport a pontoon from a land location into a body of water for ease of use in the water and towage on land over and over again without significantly impacting either.

SUMMARY OF THE INVENTION

A trailer pontoon system includes a trailer pontoon bottom designed to receive a wheel folded under the bottom of the trailer pontoon to be clear of the water in operation. The folding mechanism is designed to retract each wheel in an arc orthogonal to a rotation of the wheel. The system also includes a pair of swing arms each having a first end attached to an inside axial hub of the wheel configured to rotate on a boss of the first end. A second end of the swing arm is configured to rotate a maximum of 90 degrees from its folded position. An axis parallel to a back end of the trailer pontoon is configured to attach to each of the pair of swing arms at a respective pivot located a swing arm distance from an edge of the trailer pontoon. The axis is rotatable by less than 90 degrees to enable each wheel to retract against a suspension bumper.

The system also includes a retractable trailer tongue designed to slide in and out of a recess in the trailer pontoon bottom and lock in a trailer position and lock in a retracted position. A sliding action and a locking action thereof are based on a dual hydraulic piston action on the retractable trailer tongue. A pair of electronically controlled signal lights are located on both outside edges of the trailer pontoon back end, the signal lights each having esthetic lens's configured to hide the lights during water operation.

Figure 1A:
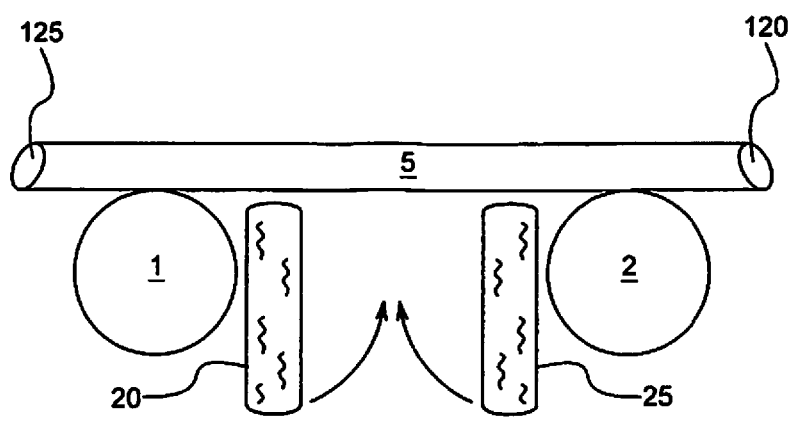
FIG. 1A is a back elevational view of a double pontoon trailer with wheels extended there between for land travel in accordance with an embodiment of the present disclosure.

Throughout the description, similar reference numbers may be used to identify similar elements depicted in multiple embodiments. Although specific embodiments of the invention have been described and illustrated, the invention is not to be limited to the specific forms or arrangements of parts so described and illustrated. The scope of the invention is to be defined by the claims appended hereto and their equivalents.

DETAILED DESCRIPTION

Reference will now be made to exemplary embodiments illustrated in the drawings and specific language will be used herein to describe the same. It will nevertheless be understood that no limitation of the scope of the disclosure is thereby intended. Alterations and further modifications of the inventive features illustrated herein and additional applications of the principles of the inventions as illustrated herein, which would occur to one skilled in the relevant art and having possession of this disclosure, are to be considered within the scope of the invention.

Throughout the present disclosure the term 'hydrodynamic' is used in the common sense to refer to the dynamics and optimization of fluid flow, specifically water, around a geometrical feature of the disclosed invention. Also the term 'dual hydraulics' refers to more than one hydraulic device in apposition to another hydraulic device similar to a manner in which opposing muscles work in the human body to effectuate movement. The term 'pontoon' refers to a flat bottomed boat or hollow volume used to float passengers and/or cargo.

The main purpose of the Trailer Pontoon is to make life easier for fisherman or people who just want to be out on the water. Choosing the right trailer for a pontoon boat is almost as important as choosing the boat itself. This is the equipment to load and launch, in addition to what the boat sits on during the winter and depending on the region's climate. Ingenious and practical, the Trailer pontoon boat is a flatboat with a built-in trailer and integrated wheels. When the pontoon is in the water, the wheels fold up (out of sight to keep dry) and will also retract under the deck. This product has its own battery power source and once ready to take the pontoon out of the water, users can simply press a few buttons to allow the wheels to extend from the bottom. The tongue will protrude from the front to hook up to the vehicle, with the addition of built-in lights for breaking, turning and driving at night. Trailer Pontoon is essential for avid ocean lovers, fisherman, other industry-specific retailer and manufacturers such as sporting goods and fishing.

FIG. 1A is a back elevational view of a double pontoon trailer with wheels extended there between for land travel in accordance with an embodiment of the present disclosure. The pontoons 1 and 2 are joined by the deck 5. The wheels 20 and 25 are extended for land use but retract in an arc as shown orthogonal to a rotation direction of each wheel. The mechanism for retracting the wheels in the orthogonal arc is shown below in subsequent figures but omitted for simplicity in the present figure. The back elevational view of the trailer pontoon shows trailer lights in accordance with an embodiment of the present disclosure. Reference numbers same as reference numbers used in other figures herein depict same or similar limitations thereof. The pontoon deck 5 sits atop the two pontoons 1 and 2 and are attached thereto. Additionally, the trailer signal lights 120 and 125 are depicted on back corners of the pontoon for use in trailer mode. In another embodiment of the trailer pontoon, electronically controlled signal lights 120 and 125 are disposed on both outside edges of the trailer pontoon back end 90 for trailer signaling operation. The signal lights 120 and 125 each have esthetic lens's configured to hide the lights during water operation. The light lens may turn opaque via sunlight in order to hide the electric lights therein for esthetic purpose.

Figure 1B:
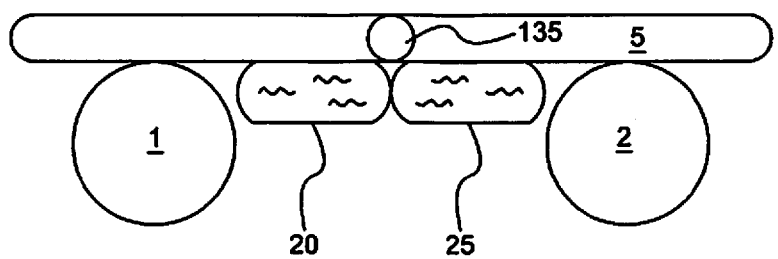
FIG. 1B is a front elevational view of the double pontoon trailer with wheels retracted in an arc orthogonal to wheel rotation in accordance with an embodiment of the present disclosure.

FIG. 1B is a front elevational view of the double pontoon trailer with wheels retracted in an arc orthogonal to wheel rotation in accordance with an embodiment of the present disclosure. The pontoons 1 and 2 are joined by the deck 5. The wheels 20 and 25 are retracted for water use via retracting in an arc as shown orthogonal to a rotation direction of each wheel. The mechanism for retracting the wheels in the orthogonal arc is shown below in subsequent figures but omitted for simplicity in the present figure. The front elevational view of the trailer pontoon showing a trailer tongue cover in accordance with an embodiment of the present disclosure. Reference numbers same as reference numbers used in other figures herein depict same or similar limitations thereof. The depiction includes the trailer tongue cover 135 in relation to the pontoons 1 and 2 and the pontoon deck 5.

Figure 2:
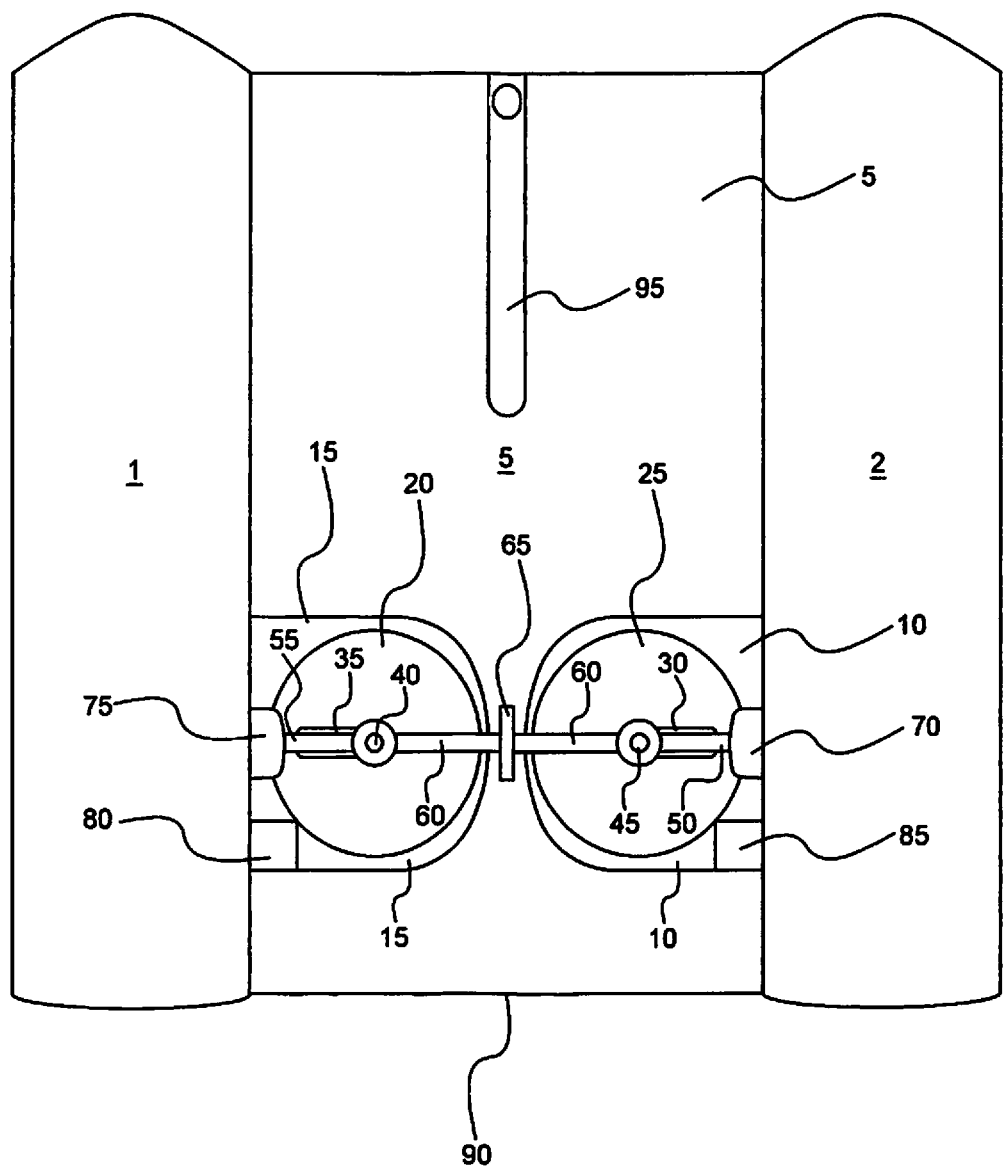
FIG. 2 is a bottom elevational view of the double pontoon trailer without wheel covers showing the wheel folding mechanisms in accordance with an embodiment of the present disclosure.

FIG. 2 is a bottom elevational view of the double pontoon trailer without wheel covers showing the wheel folding mechanisms in accordance with an embodiment of the present disclosure. The disclosed trailer pontoon device includes a first pontoon 1 and second pontoon 2 and a deck 5. The two pontoons each have respective optional semicircular depressions 10 and 15 each in the deck 5 to receive a wheel 20 and 25 folded under and into the pontoon. Also included are swing arms 30 and 35 each having a first end attached to an inside axial hub 40 and 45 of a wheel configured to rotate on a boss of the first end. A second end 50 and 55 of the swing arms rotates a maximum of 90 degrees from its folded position in a respective semicircular depression into a trailer position (shown in FIG. 2). The swing arm mechanisms are located between a wheel and a semicircular depression of the pontoons 1 and 2. The wheels 20 and 25 are therefore only drawn in circumference for simplicity of illustration. Additionally, an axis 60 parallel to a back end 90 of the trailer pontoon is attached to each of the pair of swing arms at a respective pivot 70 and 75 located a swing arm distance from an edge of the trailer pontoon. The axis 60 is rotatable by less than 90 degrees to enable each wheel to retract against a respective suspension bumper 80 and 85.

An embodiment of the trailer pontoon device is disclosed wherein a length of the swing arm 30 and 35 is approximately equal to a radius of one of the wheels. Also, a maximum 90 degree movement of the swing arm 30 and 35 is actuated and locked by electronically controlled hydraulics. A retraction of each wheel 20 and 25 against a respective suspension bumper 80 and 85 is included wherein an axis of rotation of the swing arms 30 and 35 is limited to less than 90 degrees and is actuated and limited by electronically controlled hydraulics. The swing arm pivot on the axis 30 and 35 is disposed at an end of the axis to enable the wheel to rotate free and clear of the trailer pontoon outside the wheel well. The suspension bumpers 80 and 85 comprise one of a hard rubber, a metallic spring and hybrids thereof based on a load factor of the trailer pontoon.

The swing arms 30 and 35 move from a folded position under the bottom of the pontoon via a first hydraulic into the less than 90 degree position via a second hydraulic via electronic control. Also disclosed is a push button coordinated electronic control of the dual hydraulics of the retractable trailer tongue 95 and a dual hydraulics for the swing arm 30 and 35 movement and lockage.

Figure 3:
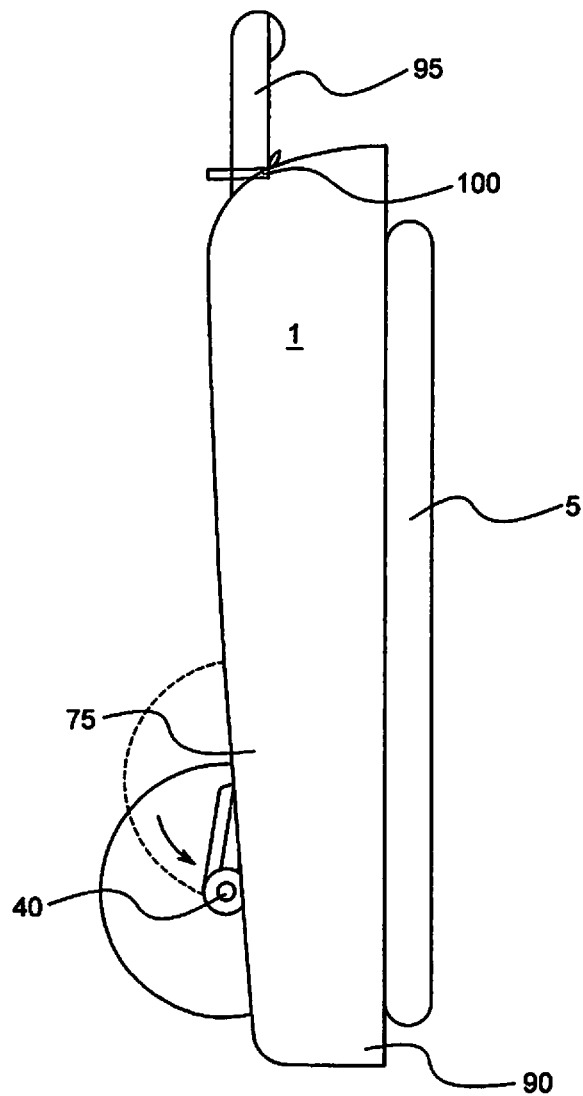
FIG. 3 is a side elevational view of the trailer pontoon showing a wheel placement and an extended trailer tongue in accordance with an embodiment of the present disclosure.

FIG. 3 is a side elevational view of the trailer pontoon showing a retracting wheel and an extended trailer tongue in accordance with an embodiment of the present disclosure. Reference numbers same as reference numbers used in other figures herein depict same or similar limitations thereof. The swing arm mechanisms are located between a wheel and a semicircular depression of the pontoons 1 and 2 attached to the deck 5. The wheels 20 and 25 are therefore only drawn in circumference for simplicity of illustration. Additionally, trailer tongue 95 is secured in the extended position by lock pin 100. Hydraulics are also used to lock the trailer tongue 95 into position either retracted or extended. The broken line indication of the wheel 20 is shown before the wheel is retracted against the suspension bumper 80. A retractable angle of greater than 90 degrees is also used to put the wheels up out of the water for pontoon operation.

A disclosed trailer pontoon device includes a trailer pontoon bottom having two semicircular depressions each to receive a wheel folded under and into the a trailer pontoon 1 and 2. Also included is a pair of swing arms each having a first end attached to an inside axial hub of the wheel configured to rotate on a boss of the first end. A second end of the swing arm rotates a maximum of 90 degrees from its folded position in a respective semicircular depression into a trailer position. Additionally, an axis parallel to a back end of the trailer pontoon is attached to each of the pair of swing arms at a respective pivot located a swing arm distance from an edge of the trailer pontoon. The axis is rotatable by less than 90 degrees to enable each wheel to retract against a suspension bumper.

An embodiment of the trailer pontoon device includes a retractable trailer tongue designed to slide in and out of a recess in the trailer pontoon bottom and lock in a trailer position. The retractable trailer tongue also locks in a retracted position. The sliding action and locking action thereof are based on a dual hydraulic piston action on the retractable trailer tongue. In other words, a single hydraulic piston actuates and locks an extension movement of the tongue and a second hydraulic piston action actuates and locks a retraction movement of the tongue. Additional embodiments enable the retractable trailer tongue locking into an extended position and locking into a recessed position via a hardened steel pin for extra security precautions. Furthermore, a hydrodynamic tongue cover is designed to permanently attach to a front portion of the retractable trailer tongue to provide a wind shield and to provide an aerodynamic advantage in the water.

Figure 4:
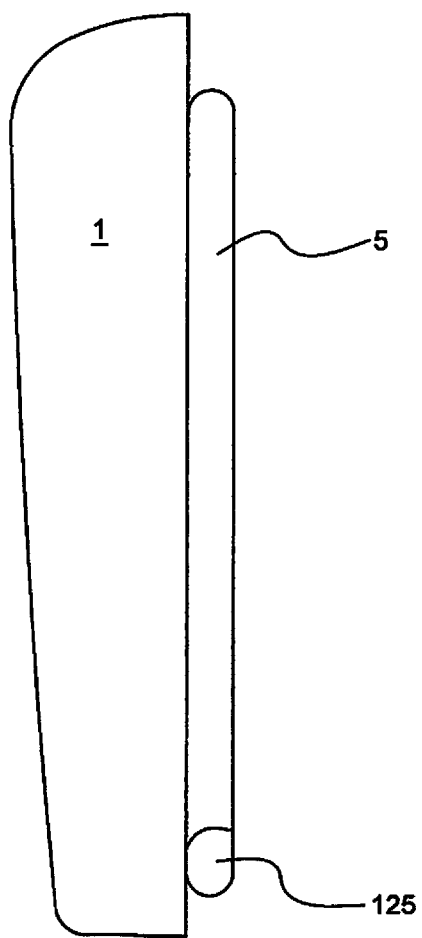
FIG. 4 is a side elevational view of the trailer pontoon after wheels are retracted in an arc orthogonal to wheel rotation in accordance with an embodiment of the present disclosure.

FIG. 4 is a side elevational view of the trailer pontoon showing a wheel well in accordance with an embodiment of the present disclosure. Reference numbers same as reference numbers used in other figures herein depict same or similar limitations thereof. The depiction includes the first pontoon 1, the pontoon deck 5 and the signal light 125 in relation to the pontoon deck 5. The wheels 20 and 25 are retracted in an arc orthogonal to tire rotation. The wheels 20 and 25 are retracted between the pontoons and do not show in side elevational view.

Figure 5:
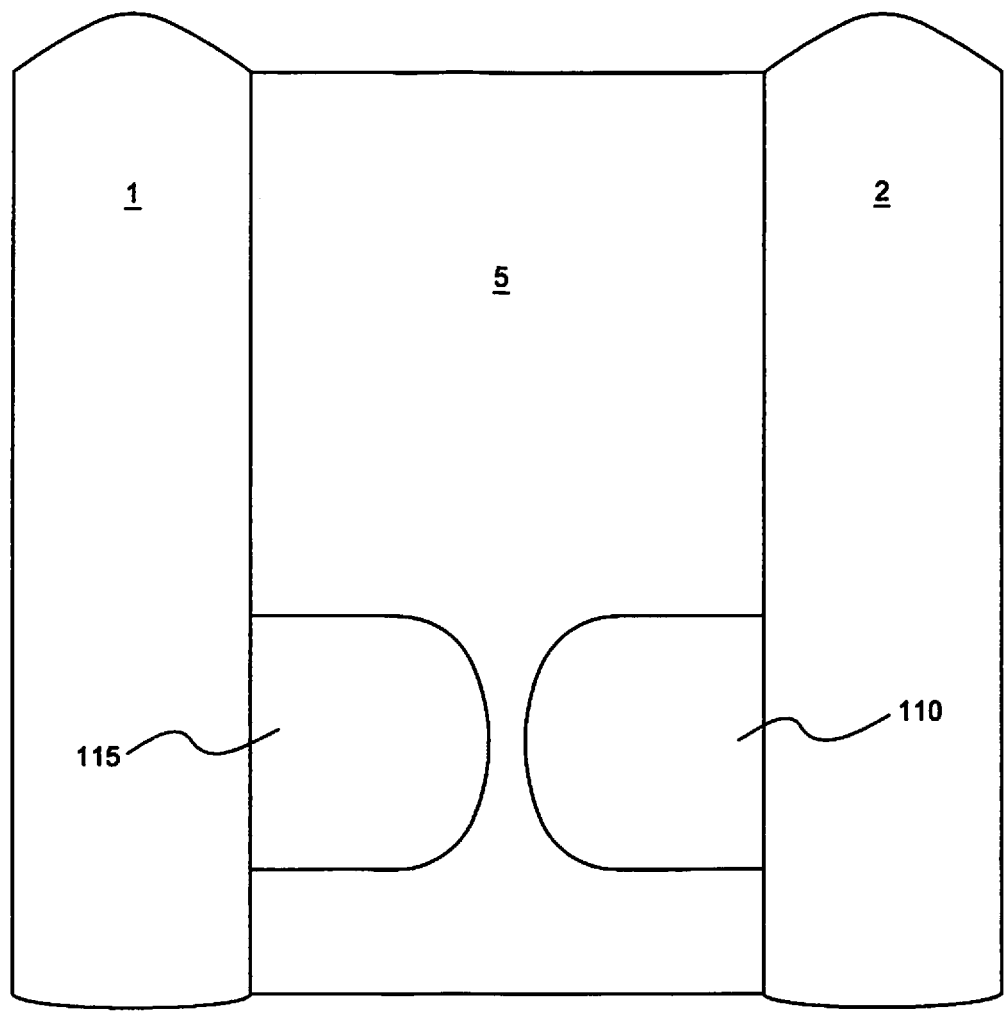
FIG. 5 is a bottom elevational view of the trailer pontoon showing pontoon hydrodynamic wheel covers in accordance with an embodiment of the present disclosure.

FIG. 5 is a bottom elevational view of the trailer pontoon showing hydrodynamic wheel covers in accordance with an embodiment of the present disclosure. Reference numbers same as reference numbers used in other figures herein depict same or similar limitations thereof. Wheel covers 110 and 115 on the wheels 20 and 25 are fit into a respective semicircular depression to provide a hydrodynamically flush surface with a respective pontoon thereof. The wheel covers 110 and 115 may be disposed over the semicircular depressions when the wheels are folded under the pontoon or when the wheels are extended and retracted and outside the semicircular depressions. The covers 110 and 115 on the wheels 20 and 25 are also engineered to be hydrodynamically raised or lowered in relation to the respective pontoon in relation to the deck 5 thereof.

Also, each wheel 20 and 25 has wheel covers 110 and 115 permanently or temporarily attached to an outside axial hub of a wheel to provide wind drag protection when towed on land and hydrodynamic protection when operated in the water. Additionally, each of the semicircular depressions 10 and 15 in the pontoons also form a wheel well for a respective wheel when it is unfolded and locked in its land operational position.

An embodiment of the trailer pontoon system further includes a second pair of wheels, a second pair of swing arms and a second wheel axis including all supporting limitations thereof for a 4 wheel system (not depicted). An embodiment of the trailer pontoon system further includes a multiple pair of wheels, a multiple pair of swing arms and a multiple wheel axis including all supporting limitations thereof for a multiple wheel system.

Design modifications of the disclosure also include wheels which retract via the swing arms 30 and 35 out of the water but parallel with the side of the pontoon rather than folded under the pontoon. In fact both a retractable and a folding action are achieved via the disclosed mechanisms.

Figure 6A:
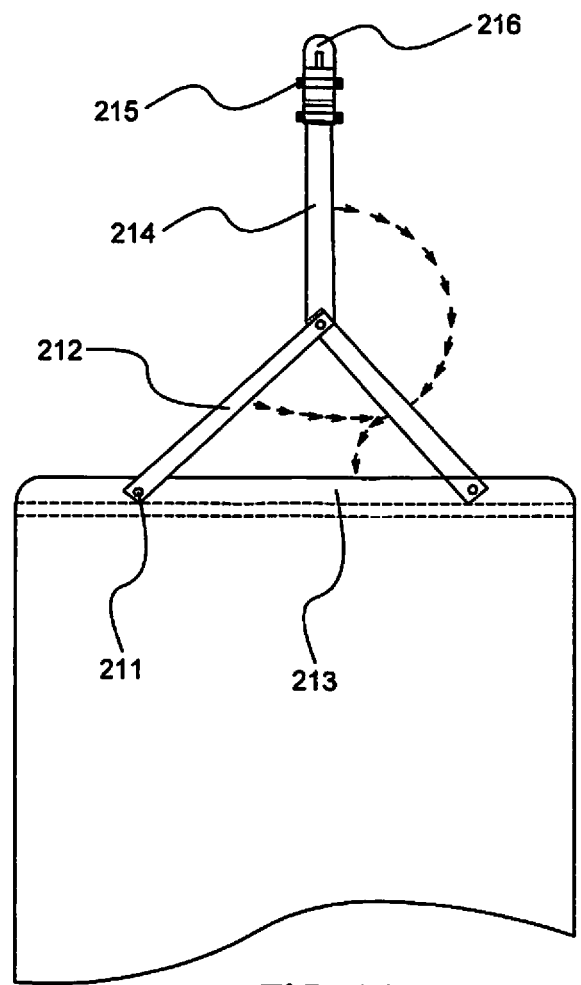
FIG. 6A is a top view of a hitch receiver for the trailer pontoon configured to retract between the deck and the pontoons thereof in accordance with an embodiment of the present disclosure.

FIG. 6A is a top view of a hitch receiver for the trailer pontoon configured to retract between the deck and the pontoons thereof in accordance with an embodiment of the present disclosure. The hitch receiver is attached to the pontoon deck 5 via a pull pin 211 at a first cross member 212 and a rivet at a second cross member 213. A joining member 214 is attached to a receiver apparatus 216 via a pull pin 215 and a hinge pin 220. Absent the pull pin 211, the complete receiving mechanism as enumerated above tucks between the pontoons and the deck of the pontoon trailer boat.

Figure 6B:
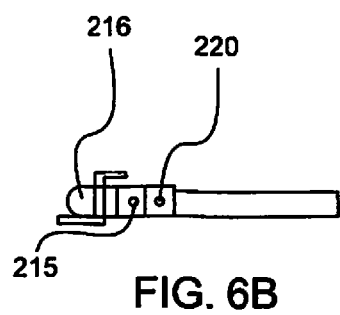
FIG. 6B is a side cutaway view of the retracting hitch receiver of FIG. 13 configured to flip up out of the way in accordance with an embodiment of the present disclosure.

FIG. 6B is a side cutaway view of the retracting hitch receiver of FIG. 13 configured to flip up out of the way in accordance with an embodiment of the present disclosure. The depiction includes components similar and the same to the components of FIG. 13 with same reference numbers such as receiver 216, and pull pin 215. Absent the pull pin 215, the receiver flips up 90 degrees to facilitate folding and storing the receiver apparatus and mechanism between the pontoons and the deck of the trailer pontoon boat for water operation and for storage.

Figure 7:
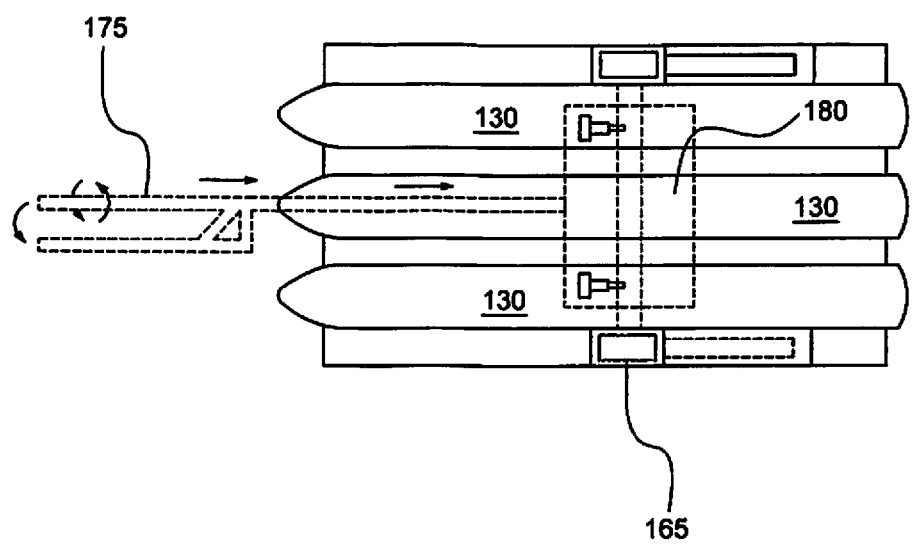
FIG. 7 is a bottom view of a tri-pontoon trailer boat in accordance with an embodiment of the present disclosure.

FIG. 7 is a bottom view of a tri-pontoon trailer boat in accordance with an embodiment of the present disclosure. The depiction includes an enclosed housing 180 for hydraulics and an airplane nose landing gear collapsible assembly 165 for retracting the wheels from water exposure for boat functions. The tongue assembly 175 also retracts into a recess in the boat hull or in the hull of a pontoon. The depiction includes the three pontoons 130 which are spaced apart but adjacent to each other.

Figure 8:
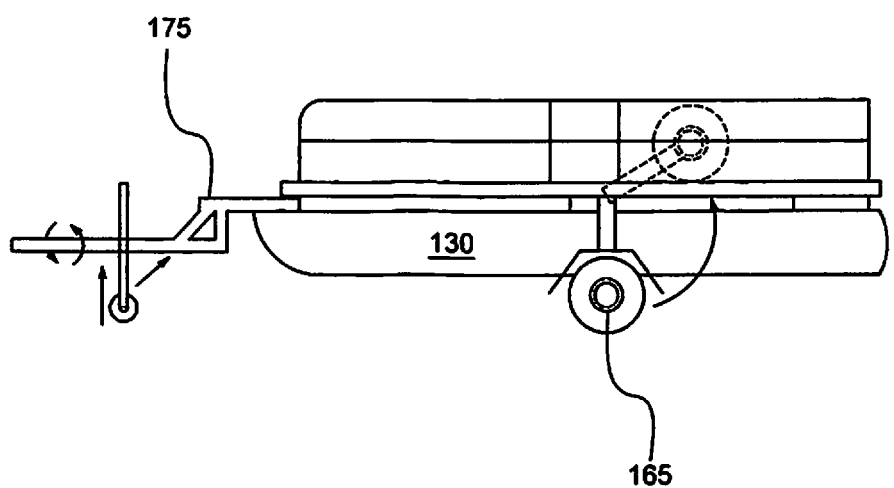
FIG. 8 is a side view of the tri-pontoon trailer boat in accordance with an embodiment of the present disclosure.

FIG. 8 is a side view of the tri-pontoon trailer boat in accordance with an embodiment of the present disclosure. The depiction includes an enclosed housing 180 for hydraulics (not shown) and an airplane nose landing gear collapsible assembly 165 for retracting the wheels into broken line position from water exposure during boat functions. The tongue assembly 175 also retracts into a recess in the boat hull or adjacent the boat hull or a pontoon. The depiction also includes the three pontoons 130.

Figure 9:
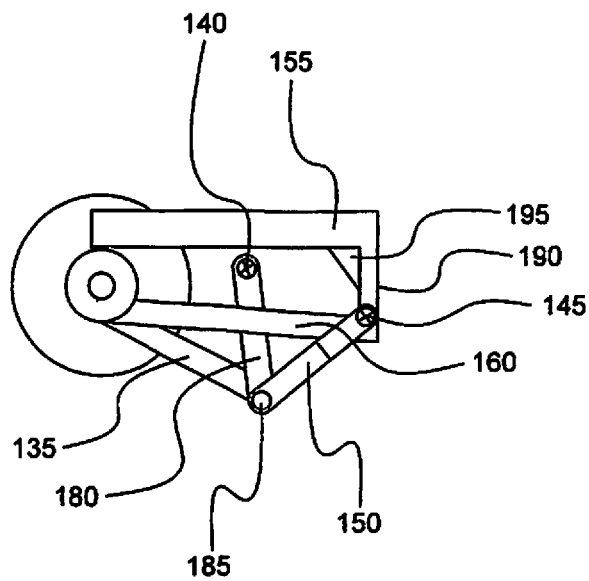
FIG. 9 is a detail view of the airplane nose landing gear collapsible assembly in a stored position in accordance with an embodiment of the disclosure.

FIG. 9 is a detail view of the airplane nose landing gear collapsible assembly in a stored position in accordance with an embodiment of the disclosure. The depiction includes a drag strut 135, telescopic strut 155, a first fixed point 140 and a second fixed point 145, a bending arm 150, a supporting strut 160, a drag strut knee 185 and a drag strut extension 135 which enable downward movement of the retracting wheel assembly. The bending arm 150 locks into a straight position for a stored retracted configuration and for a downward extended configuration. Other supporting arms and the telescoping arm assist in mechanical movement and static load strengthening of the wheel assembly.

Figure 10:
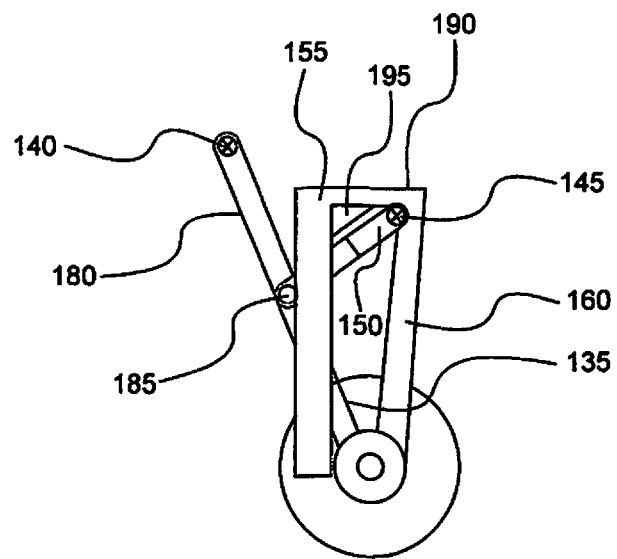
FIG. 10 is a detail view of the airplane nose landing gear collapsible assembly in a down extended position in accordance with an embodiment of the disclosure.

FIG. 10 is a detail view of the airplane nose landing gear collapsible assembly in a down extended position in accordance with an embodiment of the disclosure. The depiction includes components similar and the same to the components of FIG. 9 with same reference numbers such as the telescoping strut 155, the first fixed stationary point 140, the second fixed stationary point 145 and the bending arm 150 which locks into a straight position as explained above.

Figure 11:
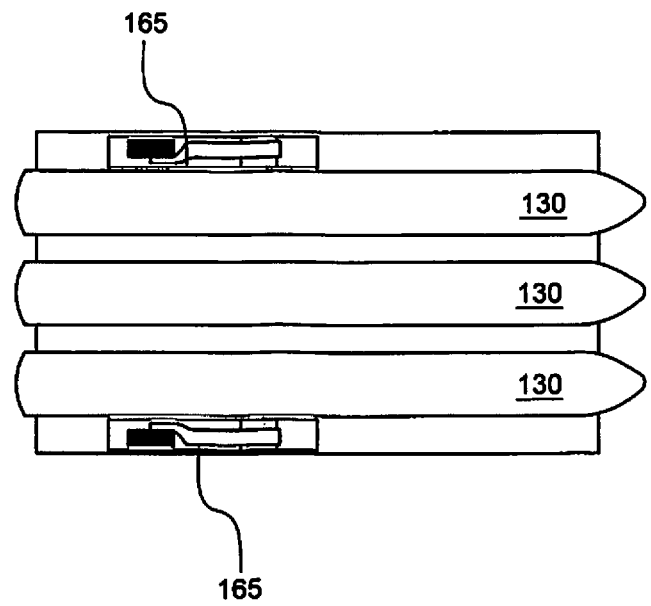
FIG. 11 is a bottom detail view of the tri-pontoon boat having adjacent pontoons in accordance with an embodiment of the present disclosure.

FIG. 11 is a bottom detail view of the tri-pontoon boat having adjacent pontoons in accordance with an embodiment of the present disclosure. Other pontoon configurations are included in the disclosure including a single pontoon and multiple pontoons according to design and functional requirements. The depiction includes the wheel assembly 165 and a housing for the wheel assembly. The wheels and wheel housing 165 are configured behind seats on a deck of the pontoon boat in order to get the wheels out of the water and also out of the way of use of the boat deck. The motive force behind the moving mechanisms of the wheels are hydraulic in some embodiments and electric in other embodiments. The depiction also includes the three pontoons 130.

Figure 12:
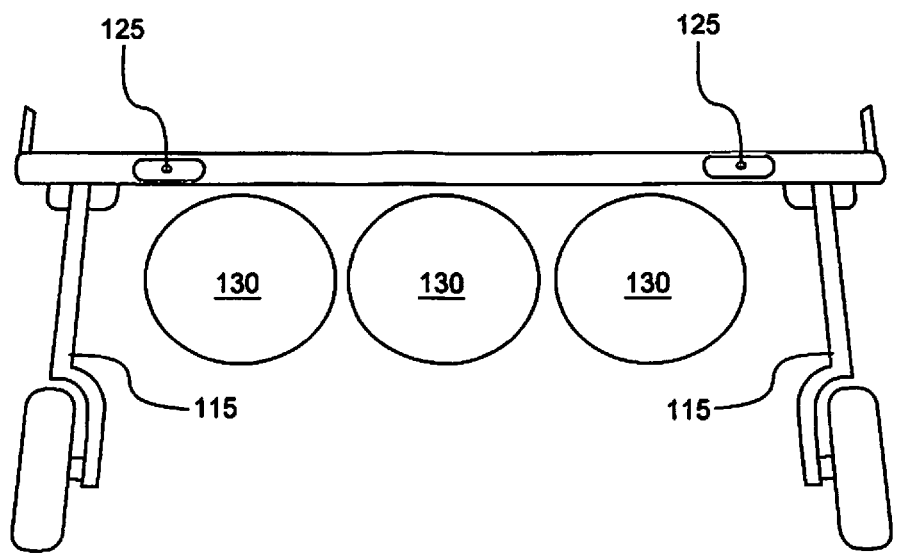
FIG. 12 is a rear view of the tri-pontoon boat having spaced apart pontoons and rear lights in accordance with an embodiment of the present disclosure.

FIG. 12 is a rear view of the tri-pontoon boat having spaced-apart pontoons and rear lights in accordance with an embodiment of the present disclosure. The depiction includes the retracting wheel gear 115, the two rear signal lights 125 and the three pontoons 130. The rear lights are wired to plug into a motive vehicle to source power to and work with the motive vehicle lights. The retracting wheel gear or landing gear retracts towards the front of the pontoon.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

While the forgoing examples are illustrative of the principles of the present disclosure in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the disclosure be limited, except as by the specification and claims set forth herein.

What is claimed is:

1. A trailer pontoon device, comprising:
a plurality of wheel retracting mechanisms and a wheel for each mechanism thereof for a land operation, each retracting mechanism and the respective wheel thereof configured to retract under a deck of the trailer pontoon device for water operation,
wherein each retracting mechanism is configured to retract its respective wheel in an arc orthogonal to a rotation of each wheel; and
a placement of each wheel against a respective suspension bumper and an axis rotation against the bumper is limited to less than 90 degrees actuated and limited by an electronically controlled hydraulics.

2. The trailer pontoon device of claim 1, wherein each wheel is configured to retract underneath a seat of the trailer deck.

3. The trailer pontoon device of claim 1, further comprising a retractable trailer tongue configured to slide in and out of a recess in the trailer pontoon bottom and lock in a trailer position and lock in a retracted position, wherein a sliding action and a locking action thereof are based on a dual hydraulic piston action on the retractable trailer tongue.

4. The trailer pontoon device of claim 1, further comprising a hydrodynamic wheel cover for each wheel attached to an outside axial hub of a wheel to provide wind drag protection when towed on land and hydrodynamic protection when operated in the water.

5. The trailer pontoon device of claim 1, wherein a semicircular wheel well depression is formed into a bottom of the trailer deck to receive a respective wheel.

6. The trailer pontoon device of claim 1, further comprising a retracting arm having a length approximately equal to a radius of one of the wheels.

7. The trailer pontoon device of claim 1, further comprising a maximum 90 degree movement of a retracting arm actuated and locked by electronically controlled hydraulics.

8. The trailer pontoon device of claim 1, further comprising a swing arm pivot on a wheel axis disposed at an end of the axis to enable the wheel to rotate free and clear of the trailer pontoon.

9. The trailer pontoon device of claim 1, further comprising a plurality of electronically controlled signal lights disposed on both outside edges of the trailer pontoon back end, the signal lights each having lens's configured to hide the lights during water operation.

10. A trailer pontoon apparatus, comprising:
a trailer pontoon deck configured to receive a wheel folded under the bottom of the trailer pontoon deck;
a pair of swing arms each having a first end attached to an inside axial hub of the wheel configured to rotate on a boss of the first end, a second end of the swing arm configured to rotate a maximum of 90 degrees from its folded position;
an axis parallel to a back end of the trailer pontoon and configured to attach to each of the pair of swing arms at a respective pivot, the axis rotatable by less than 90 degrees to enable each wheel to retract against a suspension bumper; and
a retractable trailer tongue configured to slide in and out of a recess in the trailer pontoon bottom and lock in a trailer position and lock in a retracted position, wherein a sliding action and a locking action thereof are based on a dual hydraulic piston action on the retractable trailer tongue.

11. The trailer pontoon apparatus of claim 10, wherein the dual hydraulic piston of the retractable trailer tongue controls a movement of the tongue outwardly via a first hydraulic and inwardly via a second hydraulic with respect to the recess in the trailer pontoon bottom.

12. The trailer pontoon apparatus of claim 10, wherein the retractable trailer tongue locks into an extended position and a recessed position via a hardened steel pin for security precautions.

13. The trailer pontoon apparatus of claim 10, further comprising a hydrodynamic tongue cover configured to permanently attach to a front portion of the retractable trailer tongue to provide a wind and a water aerodynamic advantage.

14. The trailer pontoon apparatus of claim 10, further comprising a plurality of electronically controlled signal lights disposed on both outside edges of the trailer pontoon back end, the signal lights each having len's configured to hide the lights during water operation.

15. A trailer pontoon system, comprising:
a trailer pontoon bottom configured to receive a wheel folded under the bottom of the trailer pontoon so that a cover on the wheel is hydrodynamically flush with the bottom thereof;
a pair of swing arms each having a first end attached to an inside axial hub of the wheel configured to rotate on a boss of the first end, a second end of the swing arm configured to rotate a maximum of 90 degrees from its folded position in a respective semicircular depression into a trailer position;
an axis parallel to a back end of the trailer pontoon and configured to attach to each of the pair of swing arms at a respective pivot located a swing arm distance from an edge of the trailer pontoon, the axis rotatable by less than 90 degrees to enable each wheel to retract against a suspension bumper;
a retractable trailer tongue configured to slide in and out of a recess in the trailer pontoon bottom and lock in a trailer position and lock in a retracted position, wherein a sliding action and a locking action thereof are based on a dual hydraulic piston action on the retractable trailer tongue; and a plurality of electronically controlled signal lights disposed on both outside edges of the trailer pontoon back end, the signal lights each having esthetic lens's configured to hide the lights during water operation.

16. The trailer pontoon system of claim 15, further comprising a lens covering the signal lights, the lens configured to turn opaque in the presence of daylight and obscure the signal lights during boating operations.

17. The trailer pontoon system of claim 15, wherein the swing arms move from a folded position under the bottom of the pontoon via a first hydraulic into the less than 90 degree position via a second hydraulic via electronic control.

18. The trailer pontoon system of claim 15, further comprising a push button coordinated electronic control of the dual hydraulics of the retractable trailer tongue and a dual hydraulics for the swing arm movement and lockage.

19. The trailer pontoon system of claim 15, further comprising a second pair of wheels, a second pair of swing arms and a second wheel axis including all supporting limitations thereof for a 4 wheel system.

\* \* \* \* \*